United States Patent [19]
Davidts et al.

[11] Patent Number: 5,845,761
[45] Date of Patent: Dec. 8, 1998

[54] DEVICE FOR SCRAPING THE RETURNING SIDE OF A CONVEYOR BELT

[76] Inventors: Emmanuel Davidts, Rue d'Hubersart, 1, 7191 Ecaussinnes, Belgium; André Wartelle, Rue Roger Lecerf, 260, 59840 Premesques, France

[21] Appl. No.: 287,610

[22] Filed: Aug. 9, 1994

[51] Int. Cl.⁶ ................................................. B65G 45/00
[52] U.S. Cl. ........................................ 198/499; 15/256.5
[58] Field of Search .................................. 198/497, 499; 15/256.5, 256.51

[56] References Cited

U.S. PATENT DOCUMENTS

| | | |
|---|---|---|
| 4,257,517 | 3/1981 | MacPherson et al. |
| 4,696,388 | 9/1987 | Stoll. |
| 4,802,928 | 2/1989 | Dunlap .......................... 15/256.5 |
| 5,213,197 | 5/1993 | Mohri ............................ 198/499 |
| 5,339,947 | 8/1994 | Campanile .................... 198/499 |
| 5,344,000 | 9/1994 | Gleason ........................ 198/497 |

FOREIGN PATENT DOCUMENTS 2372755 12/1976 France.
2227992 8/1990 United Kingdom.

*Primary Examiner*—Joseph E. Valenza
*Attorney, Agent, or Firm*—Watson Cole Grindle Watson, P.L.L.C.

[57] ABSTRACT

A device for scraping the return side of a conveyor belt, includes an elongated block of a resilient material which engages a support profile, said elongated block having a central zone through which it engages the support profile and, on either side of this central zone, a zone wherein the elongated block diverges from the support profile.

14 Claims, 3 Drawing Sheets

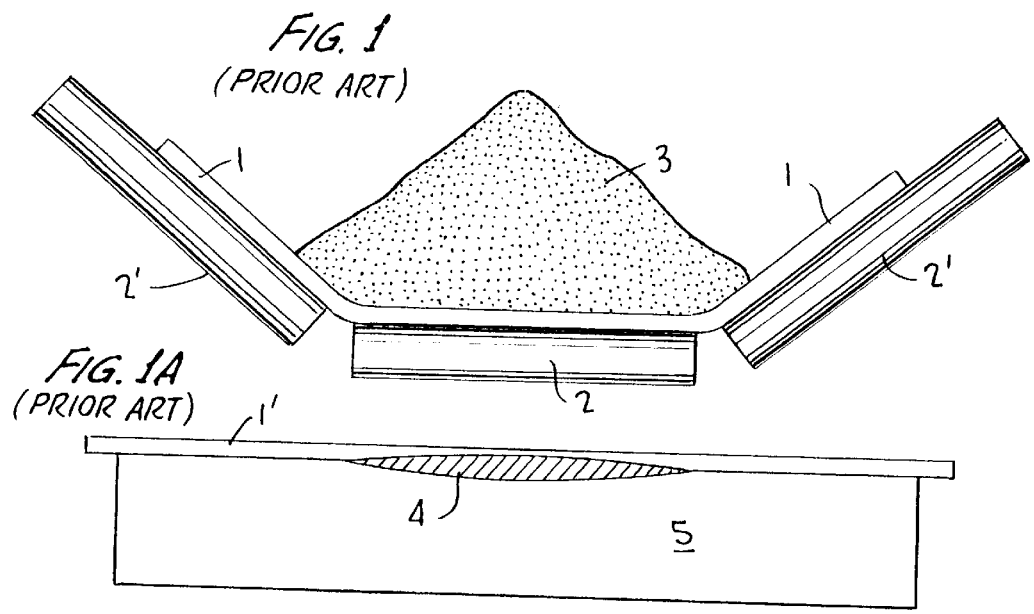
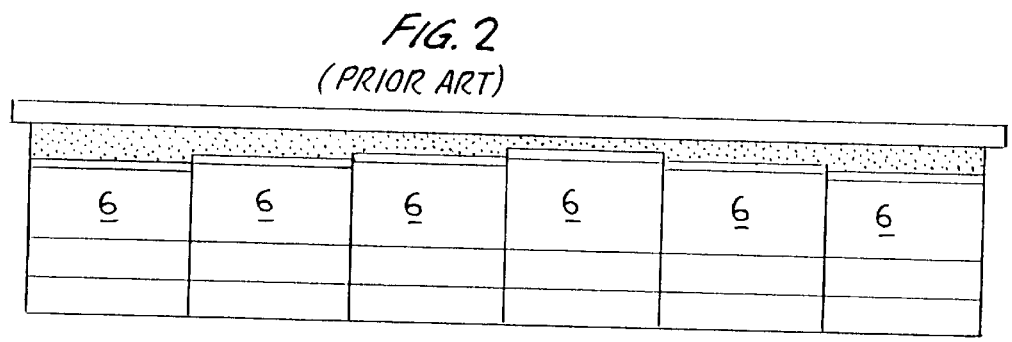
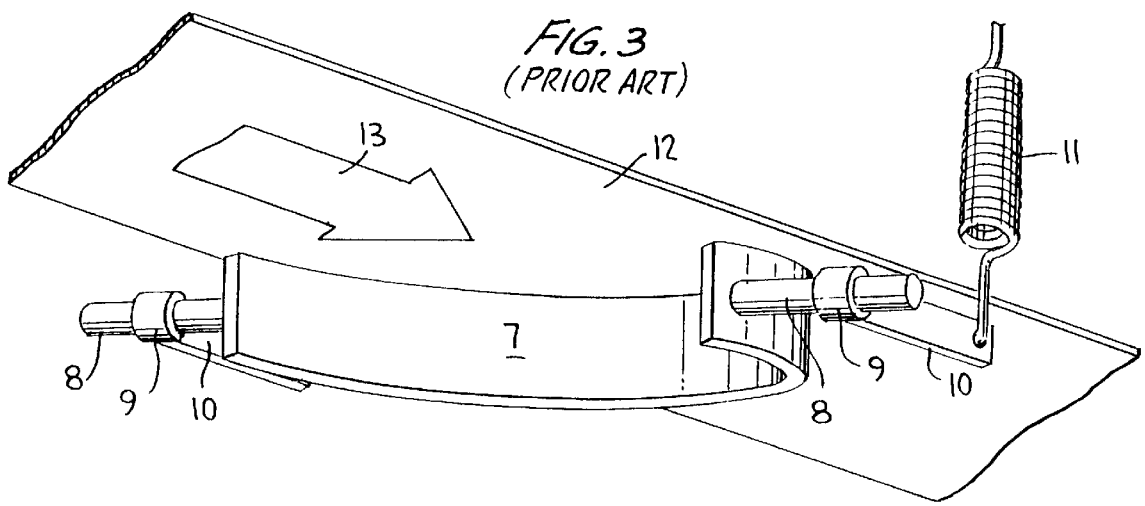

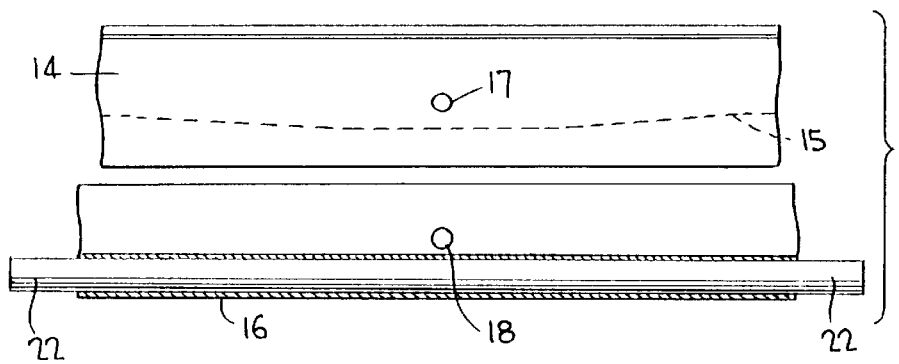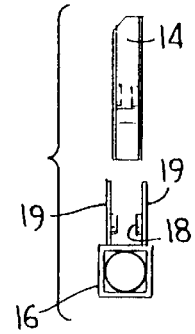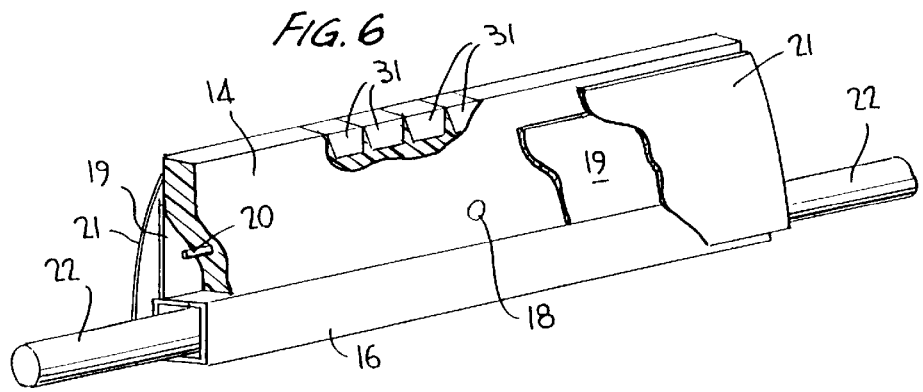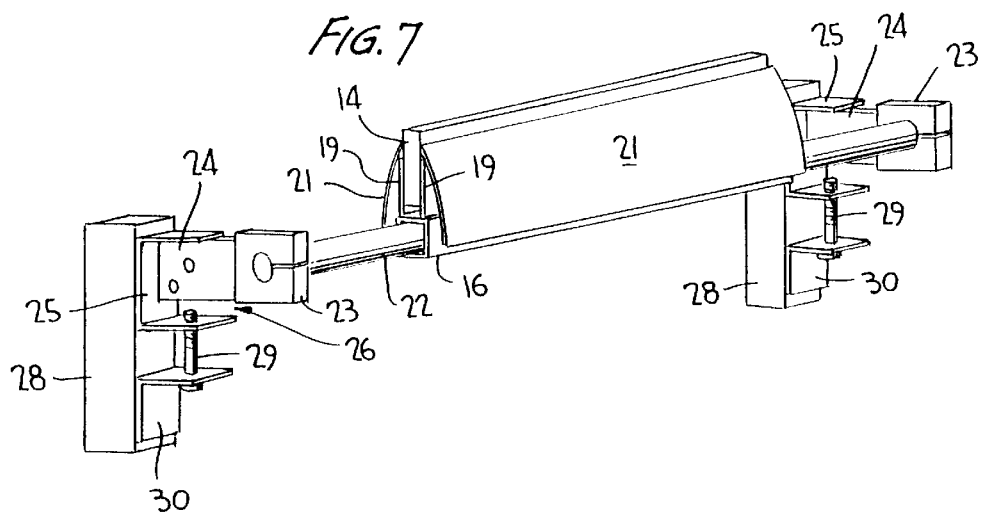

DEVICE FOR SCRAPING THE RETURNING SIDE OF A CONVEYOR BELT

BACKGROUND OF THE INVENTION

The invention relates to a device for scraping the returning side of a conveyor belt.

Products of different natures such as charcoals, minerals, gravels and various pulverulent or powdery products transported by conveyor belts tend to dispose themselves in a natural way in talus. The weight of a talus formed under these circumstances has as direct result that the materials which are more strongly encrusted in the central zone of the conveyor belt cause a more pronounced wear of the scraper blade in its central portion.

In order to obviate this situation, there has already been proposed to use segmented so-called "wear take-up" blades as scraper means.

It has also been proposed to make use of a curved blade extending in a plane approaching substantially a plane parallel to that wherein the returning side to be disencrusted extends and being pivotally mounted on horizontal pivots.

Obviously, such scrapers are mounted behind the head drum, in the zone where the returning side is formed.

The scrapers known at present and related to the hereabove described types offer the disadvantage of taking in an important space, and of requiring an onerous maintenance especially due to the necessity of a continuous adjustment. Their inefficiency arises also from their complexity and from the difficulty to provide an automatic adaptation thereof in function of their wear.

SUMMARY OF THE INVENTION

An object of the invention is to obviate these different drawbacks and to provide a scraper device of a new and original type which ensures precisely an automatic adaptation to the operation conditions arising from the higher stresses of the central portion of the scraper blade or of the elements constituting this scraper blade.

In order to achieve this object according to the invention, the device comprises an elongated blade of a resilient material, and a support profile engaging this blade and exerting a pressure in the direction of said returning side, said elongated blade having a central zone through which it engages said support profile and, on either side of this central zone, a zone wherein it diverges progressively from said support profile.

In a possible embodiment, the elongated blade has a substantially convex side which engages said support profile.

A detail of the invention consists in the fact that at least one stiffening element is embedded in the mass constituting the elongated blade of resilient material.

According to a preferably applied embodiment, scraper inserts are included in the blade of resilient material, which scraper inserts have substantially the shape of trapeziums, the large base of which is directed, when considering their operative position, towards the returning side of the conveyor belt.

Other details and advantages of the invention will become apparent from the description given hereinafter of a device for scraping the returning side of a conveyor belt according to the invention.

BRIEF DESCRIPTION OF THE DRAWINGS

This description is only given by way of example and does not limit the invention. The reference numerals relate to the annexed Figures.

FIG. 1 shows schematically the sloped arrangement of the materials transported on a gutter forming conveyor belt.

FIG. 1A schematically shows a prior art scraper blade for the conveyor belt.

FIG. 2 shows also schematically the disposition according to the state of the art of the segmented so-called wear take-up blades.

FIG. 3 shows an assembly pertaining to the prior art.

FIG. 4 is an expanded front elevational view of a blade composed of an elongated block of resilient material destined to receive the wear resistant inserts and their metal support.

FIG. 5 is an expanded side elevational view of the blade and its metal support according to FIG. 4.

FIG. 6 is a cutaway perspective view of the blade according to the invention and of its metal support.

FIG. 7 is a perspective view showing how the blade is mounted into its damping supports.

DETAILED DESCRIPTION OF THE INVENTION

Figure 8:
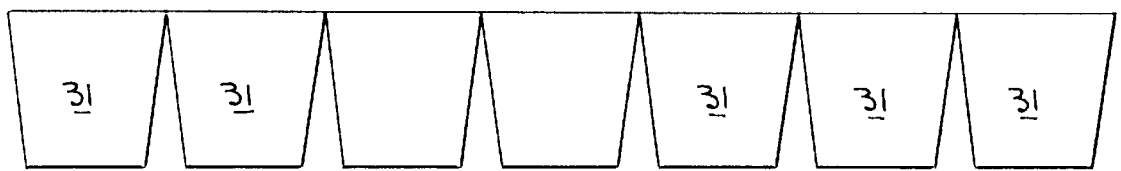
FIG. 8 shows the position of a blade according to the invention in its state of rest and equipped with scraper inserts.

FIG. 1 shows thus clearly the problem solved by the invention starting from the conclusion that the degree of wear of the blades in a scraper device is not the same over the entire length of the device. In this Figure, the angle formed by the conveyor belt 1 displaced over a central roller 2 and lateral rollers 2' can be seen. The materials transported over the conveyor belt 1 form a natural talus 3. A scraper blade 5 acting on the returning side 1' meets in the central portion of the returning side 1' an amount of material 4 to be released, the importance of which has been exaggerated in the Figure. The same is true for the wear of the central portion of the returning side 1' of the conveyor belt.

FIG. 2 illustrates a scraper device considered to pertain to the prior art. In this device, the blades of the scraper device are segmented and are provided for taking up the wear of these products in the aforedescribed irregular way. The scraper blades of the device according to FIG. 2 are indicated by reference numeral 6. The blades are mounted on a support which will not be further described in detail.

Another way of partially solving the aforedescribed problem is shown in FIG. 3 wherein use is made of a curved blade 7 carrying journals 8 rotatably mounted in bushes 9. Lever arms 10 subjected to the action of traction and torsion springs 11 are welded to the journals 8. When considering the displacement direction of the returning side of the conveyor belt 12 indicated by arrow 13, the wear of the central portion of the scraper blade 7 may be compensated for by the tilting motion of this curved blade 7 around the geometrical axis of the journals 8.

However, these structures offer the drawback of requiring an important space in view of their bulkiness.

The scraper device which is the subject of the present invention is illustrated in FIGS. 4 to 10.

FIG. 4 is one of the figures which illustrate clearly the basic principle of the invention and which includes a scraper blade 14 of a resilient material such as an elastomer which is characterised by the fact that the lower edge 15 of this scraper blade is either convex or has at least three sections, only the central section of which is rectilinear or substantially rectilinear and engages a support profile 16 which can be seen in FIGS. 4, 6 and 7. This scraper blade 14 may be equipped with wear resistant scraper inserts. The shape of these scraper inserts, which can be seen in FIG. 6 as well as in FIGS. 8, 9 and 10, will be described hereinafter.

FIG. 4 clearly shows that the central portion of the lower edge 15 of the scraper blade is rectilinear whereas the adjacent lateral portions of the central portion rise according to an angle which may be variable in function depending on the quality of the elastomer.

The lower edge 15 of the scraper blade 14 may also be convex.

In the centre of the scraper blade 14 a recess 17 is made which adapts itself in the operative position of the scraper blade, onto a small centering shaft 18 mounted between two plates 19 which are welded onto the support profile. This small shaft, which has to receive the blade in a snapping way, is arranged to prevent this latter blade from displacing horizontally and vertically and to permit the scraper blade after being worn to be replaced easily without having to use any screws or nuts.

The scraper blade 14 composed on an elastomer is reinforced by at least one stiffening element 20. This stiffening element 20 may be composed of glass fibres or of carbon fibres. Several stiffening elements may be embedded into the elastomeric mass forming the scraper blade.

On both sides of the scraper blade a flap 21 is fixed to the upper part thereof which assures a complete evacuation of the dust caused by the scraping operation so that this dust will in no way accumulate onto the support profile or onto any other member or element thereof. The material of which the flaps 21 are made is sufficiently flexible to adapt itself to the curvature of the scraper blade and it is also sufficiently rigid to withstand vibration during the scraping operation, which further enhances the evacuation of dust deposited onto these flaps.

The support profile 16 is extended by two journals 22. The ends of these journals are coupled to clamps 23 fixed to the extremity of two plates 24 which are enclosed by damping blocks 25 enclosed by housings 26 which may be displaced in height along supports 28. The height adjustment is achieved in any appropriate way by making use for example of an adjusting rod 29 which extends through an opening in angle plate 10 fixed to the support 28, a portion of the housing being able to slide into a groove made in one of the faces of the support 28 but which has not been shown in the drawings.

The action of the adjustable damping block, which can be seen in FIG. 7 and which comprises the elements indicated by 23 to 30, is intended to exert a sufficient control pressure to achieve the curvature necessary for taking up the wear losses and to permit in this way to maintain a permanent flexible contact between the blade and the side of the belt which is to be scraped. A function of this block is also to ensure this constant pressure during the entire life of the blade which avoids the need for any human intervention. The damping block is based on the compression and torsion principle allowing a deflection of several centimeters compensating for the taking up of wear.

Figure 9:
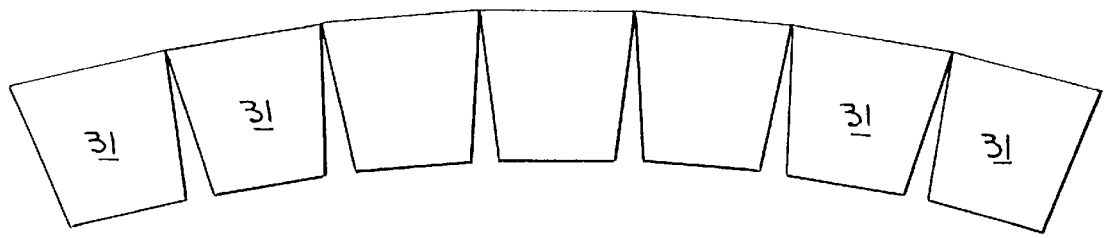
FIG. 9 shows, in a strongly exaggerated way, the curved position of a blade according to the invention provided with trapezoidal scraper inserts.
Figure 10:
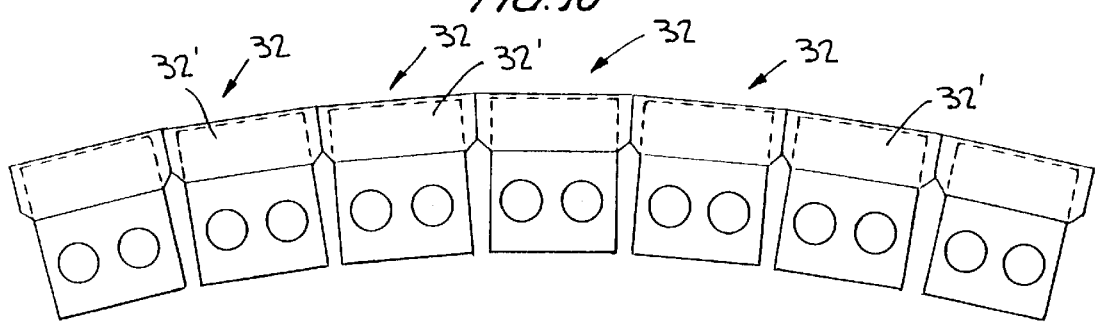
FIG. 10 shows, in a strongly exaggerated way, the curved position of a blade according to the invention provided with scraper inserts, only a portion of which being trapezoidal.

The scraper blade 14 composed of an elastomer could perform its scraping function in certain circumstances without being provided with scraper inserts 31 which can clearly be seen in FIG. 6 as well as in FIGS. 8, 9 and 10.

These scraper inserts 31 of a good wear resistant material such as steel or a metal carbide have a shape which has to adapt itself to the curvature of the blade when this blade has to show a certain curvature due to a more pronounced wear of the central portion of the scraper blade and, in general, of these scraper inserts 31.

The inserts 31 have a trapezoidal shape and their large base is directed towards the side of the blade destined to perform the scraping action. The same scraper inserts 11 are shown in the rest position in FIG. 8 while FIG. 9 shows, as previously mentioned, in a strongly exaggerated way the curvature which can be assumed in by the scraper blade and its inserts.

In a variant embodiment, the scraper inserts may have the form of inserts 32. In this case, they are composed of a substantially rectangular part wherein, however, the lateral edges of these rectangular parts 32', which engage one another, are slightly inclined to permit the scraper blade to assume a slightly rounded shape as shown in FIG. 9, the curvature according to this Figure being exaggerated for clarity.

The scraper device according to the present invention compensates automatically for the wear losses which arise in the central portion of a conventional scraper blade. To the extent that the scraper inserts of the scraper blade 14 show more pronounced signs of wear in the central portion of the scraper blade, an automatic correction is achieved due to the fact that the scraper blade engages the support profile 16.

What is claimed is:

1. A device for scraping a returning side of a conveyor belt, comprising an elongated block of a resilient material, and a support profile engaging this block and exerting a pressure in the direction of said returning side, said elongated block having a central zone through which it engages said support profile and, on either side of this central zone, a zone wherein an edge of said elongated block diverges progressively from said support profile.

2. The device as claimed in claim 1, wherein said elongated block has a substantially convex side which engages said support profile.

3. The device as claimed in claim 1, wherein at least one stiffening element is embedded in the resilient material constituting said elongated block.

4. The device as claimed in claim 3, wherein said stiffening element is made of steel, such as spring-steel.

5. The device as claimed in claim 3, wherein said stiffening element is composed of glass fibres.

6. The device as claimed in claim 3, wherein said stiffening element is composed of carbon fibres.

7. The device as claimed in claim 1, wherein said support profile carries two plates between which said elongated block of resilient material can be positioned, said support profile having extremities equipped with journals fixed in clamps which are carried by damping blocks.

8. The device as claimed in claim 7, wherein at least one small centring shaft is disposed between said two plates, which shaft penetrates into a recess made in said elongated block of resilient material when this block is inserted between said two plates.

9. The device as claimed in claim 1, wherein scraper inserts are included in said elongated block of resilient material.

10. The device as claimed in claim 9, wherein said scraper inserts have substantially the shape of trapeziums, the large base of which forming the edge of the scraper blade.

11. The device as claimed in claim 9, wherein said scraper inserts have substantially the shape of trapeziums extended by rectangles on the side which is directed, in their operative position, towards said returning side of the conveyor belt.

12. The device as claimed in claim 1, wherein said support profile has extremities supported in damping blocks.

13. The device as claimed in claim 12, wherein said damping blocks are adjustable in the direction wherein a pressure can be exerted onto said returning side.

14. The device as claimed in claim 12, wherein said damping blocks comprise a block of deformable material, at least one plate being fitted to this block and means for attaching said metal support profile being fixed onto said plate.

* * * * *